United States Patent
Roh et al.

(10) Patent No.: US 8,405,791 B2
(45) Date of Patent: Mar. 26, 2013

(54) LIQUID CRYSTAL DISPLAY DEVICE HAVING FUNCTIONAL MEMBER

(75) Inventors: Su-Dong Roh, Gyeonggi-Do (KR); In-Su Baik, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 674 days.

(21) Appl. No.: 12/318,532

(22) Filed: Dec. 30, 2008

(65) Prior Publication Data

US 2010/0039578 A1    Feb. 18, 2010

(30) Foreign Application Priority Data

Aug. 13, 2008 (KR) .................... 10-2008-0079641

(51) Int. Cl.
*G02F 1/1333* (2006.01)
(52) U.S. Cl. .......................................... 349/58; 349/12
(58) Field of Classification Search .................. 349/12, 349/58
See application file for complete search history.

(56) References Cited

U.S. PATENT DOCUMENTS

| | | | | |
|---|---|---|---|---|
| 5,659,376 A | * | 8/1997 | Uehara et al. | 349/58 |
| 2005/0285991 A1 | * | 12/2005 | Yamazaki | 349/58 |
| 2007/0065091 A1 | * | 3/2007 | Hinata et al. | 385/147 |
| 2008/0158469 A1 | * | 7/2008 | Lee | 349/58 |
| 2010/0053854 A1 | * | 3/2010 | Nishikawa et al. | 361/679.01 |

FOREIGN PATENT DOCUMENTS

| WO | WO 2006001483 A1 | * | 1/2006 |
|---|---|---|---|
| WO | WO 2007091600 A1 | * | 8/2007 |

* cited by examiner

*Primary Examiner* — Michael Caley
(74) *Attorney, Agent, or Firm* — Morgan, Lewis & Bockius LLP

(57) ABSTRACT

An LCD device capable of preventing damage of an LC panel by an impact damping member or through a design modification of a functional member when a functional plate such as a touch panel or the functional member is attached onto the LC panel. The LCD device comprises an LC panel, a backlight unit disposed below the LC panel for providing light, a functional member disposed on the LC panel within a size range of the LC panel, and an impact damping member disposed to be spacing from one or more sides of the functional member for absorbing an impact of the functional member when the LC panel moves.

9 Claims, 4 Drawing Sheets

LIQUID CRYSTAL DISPLAY DEVICE HAVING FUNCTIONAL MEMBER

RELATED APPLICATION

The present disclosure relates to subject matter contained in priority Korean Application 10-2008-0079641, filed on Aug. 13, 2008, which is herein expressly incorporated by reference in its entirety.

BACKGROUND OF THE INVENTION

1. Field of the Invention

The present invention relates to a liquid crystal display (LCD) device, and particularly, to an LCD device capable of preventing damage of an LC panel by an impact damping member or through a design modification of a functional member when a functional plate such as a touch panel or the functional member is attached onto the LC panel.

2. Background of the Invention

Generally, one of display devices, a cathode ray tube (CRT) is being widely used to a monitor of a meter, an information terminal device, etc., as well as a TV. However, an electronic device mounted with the CRT therein is not implemented in a small size and a light weight due to a large size and a heavy weight of the CRT.

In order to replace the CRT, has been proposed an LCD device having a small size, a light weight, and low power consumption. Recently, are being increased demands for a flat type display device such as a notebook computer, a desk top computer, an outdoor monitor having a large size of 30-inch or more, and a wall-mounted TV.

In order to effectively use each kind of electronic device, being widely used a touch panel for inputting a signal onto a display of a display device without requiring a remote controller or an additional input device. More concretely, a flat type display device such as a liquid crystal display (LCD) device, a plasma display panel (PDP), and an electroluminescence (EL) is provided with a functional plate such as a touch panel onto a display thereof, thereby allowing a user to select his or her desired information with watching the image display device.

FIG. 1 is a sectional view of a touch panel integral type LCD device in accordance with the conventional art.

As shown in FIG. 1, the conventional touch panel integral type LCD device comprises an LC panel 50 for representing an image, a backlight unit disposed below the LC panel 50 and providing light, and a touch panel 60 attached onto the LC panel 50. The LC panel 50 may be provided with polarizing films 51 and 52 disposed on both side surfaces thereof.

The backlight unit includes a lamp 22 disposed on one or more sides of a lower cover 10 and providing light, a lamp housing 21 for coupling the lamp 22 thereto and protecting the lamp 22 from an external impact, a reflection plate 12 for reflecting light from the lamp 22 to the upper or front LC panel 50 without optical loss, a light guide plate 24 disposed at one side of the lamp 22 for Here, the optical sheet 49 includes a diffusion plate 49a for obtaining a uniform brightness according to a viewing angle so as to enhance characteristics of light having passed through the light guide plate 24, a prism sheet 49b disposed on the diffusion plate 49a for enhancing a frontal brightness of light having passed through the diffusion plate 49a, and a protection sheet 49c for protecting the prism sheet 49b from scratch, and so on.

The LC panel 50 includes a TFT array substrate having a TFT at each unit pixel, a color filter substrate having color filters for representing colors, and an LC injected between the TFT array substrate and the color filter substrate. Here, the TFT array substrate is formed to have a larger area than the color filter substrate, thereby exposing out gate and data pad portions to which an external signal is input.

On the LC panel 50 having the polarizing films 51 and 52 attached thereto, disposed is a functional plate such as the touch panel 60, or a functional member. Here, the functional plate or the functional member has a size equal to or smaller than a size of the color filter substrate of the LC panel 50 without depending on a specific design reference.

However, when the functional member such as the touch panel 60 is attached onto the LC panel 50, the LC panel 50 become more susceptible to an external impact or vibration. This causes an edge region of the LC panel, especially, an edge region of the TFT array substrate to be damaged.

SUMMARY OF THE INVENTION

Therefore, an object of the present invention is to provide an LCD device capable of preventing damage of an LC panel by an impact damping member or through a design modification of a functional member when the functional member such as a touch panel is attached onto the LC panel.

To achieve these and other advantages and in accordance with the purpose of the present invention, as embodied and broadly described herein, there is provided a liquid crystal display (LCD) device, comprising: an LC panel; a backlight unit disposed below the LC panel for providing light; and a functional member disposed on the LC panel for preventing damage of the LC panel due to an impact when the LC panel moves.

According to another embodiment of the present invention, there is provided an LCD device, comprising: an LC panel; a backlight unit disposed below the LC panel for providing light; a functional member disposed on the LC panel within a size range of the LC panel; and an impact damping member disposed to be spacing from one or more sides of the functional member, for absorbing an impact of the functional member when the LC panel moves.

In the present invention, when the functional member for an additional function such as a touch panel is provided on the LC panel, can be prevented damage of the LC panel due to an external impact or vibration.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Hereinafter, an LCD device of the present invention will be explained in more detail with reference to the attached drawings.

Figure 1:
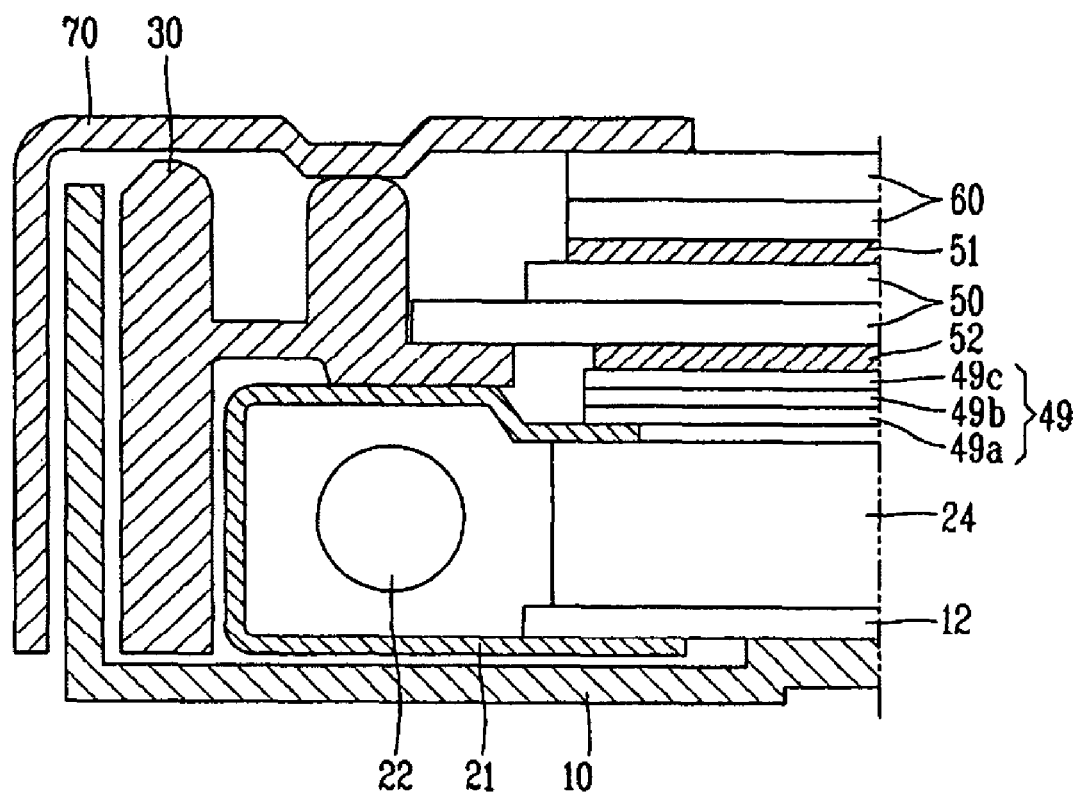
FIG. 1 is a sectional view of a touch panel integral type LCD device in accordance with the conventional art.
Figure 2:
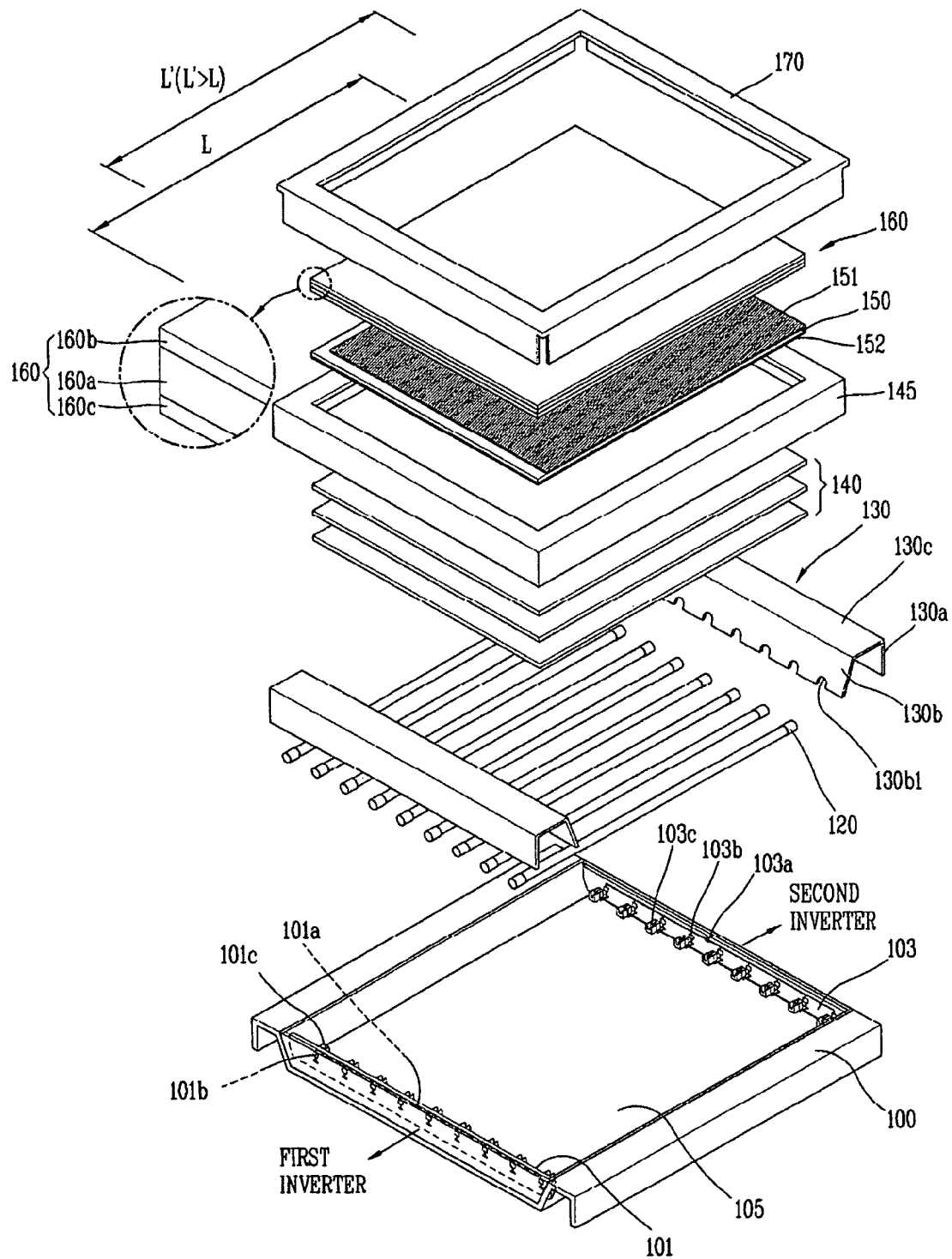
FIG. 2 is an exploded perspective view of an LCD device according to a first embodiment of the present invention.
Figure 3:
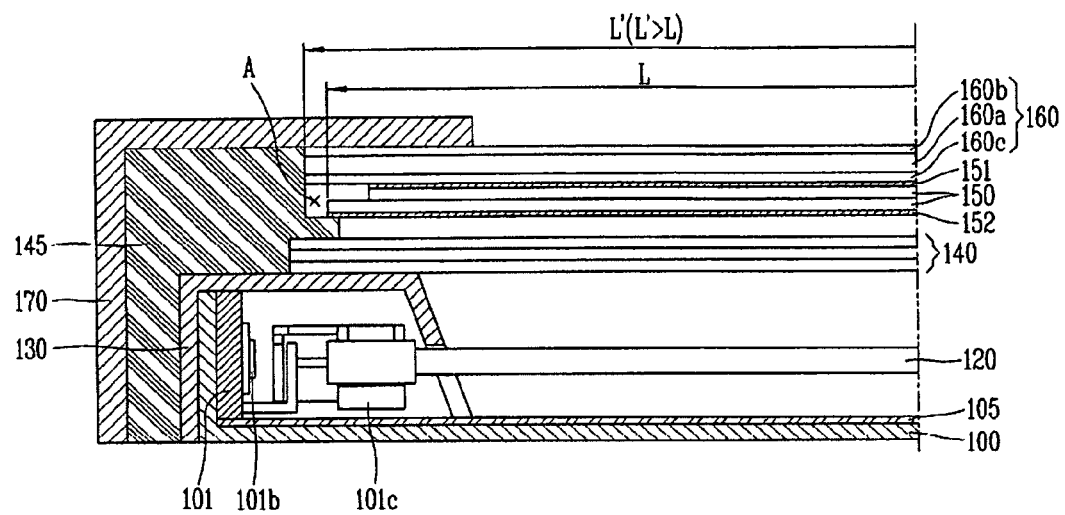
FIG. 3 is a sectional view showing a coupled state of the LCD device of FIG. 2.

FIG. 2 is an exploded perspective view of an LCD device according to a first embodiment of the present invention, and FIG. 3 is a sectional view showing a coupled state of the LCD device of FIG. 2.

As shown in FIGS. 2 and 3, the LCD device according to a first embodiment of the present invention comprises a backlight unit (not shown) for receiving a voltage from outside and providing light, an LC panel 150 disposed above the backlight unit for displaying an image, and a functional member 160 disposed on the LC panel 150 for preventing damage of the LC panel 150 due to an impact when the LC panel 150 moves.

Here, the functional member 160 may include a tempered substrate 160a serving as a protection member for protecting the LC panel 150 from an external impact, and an anti-reflect layer 160b disposed on the tempered substrate 160a for reducing reflectivity of light incident from outside. Moreover, the functional member 160 may further include an adhesion layer 160c formed of the same refractivity as the tempered substrate 160a of the functional member 160, for adhering the functional member 160 onto the LC panel 150.

On both side walls of a lower cover 100 formed of iron or Electro Galvanized Steel (EGI) plate, vertically formed are balance PCBs (Printed circuit boards) for driving a plurality of lamps 120 by receiving an AC high voltage from external first and second inverters.

More concretely, the balance PCBs 101 and 103 respectively comprise connectors 101a and 103a for receiving an AC high voltage from the first and second inverters, ballast capacitors 101b and 103b formed in patterns for outputting a stable current from the AC high voltage, and lamp sockets 101c and 103c formed to have conductivity such that a ballast current is stably introduced into the lamps 120, and formed in an angle of 90° such that a plurality of lamps 120 are easily coupled thereto.

A reflection plate 105 is attached onto the lower cover 100 at a middle region of the balance PCBs 101 and 103 vertically disposed at both sides of the lower cover 100. As the reflection plate 105, may be used a white polyester film, or a film coated with metallic material such as Ag or Al. Visible rays on the reflection plate 105 has reflectivity about 90~97%. The thicker the coated film is, the higher the reflectivity is.

The plurality of lamps 120 are coupled to the lamp sockets 101c and 103c fixed onto the balance PCBs 101 and 103 and formed to be upwardly bent. Here, a distance between the lamps 120 coupled to the lamp sockets 101c and 103c, and the reflection plate 105 disposed at a rear side of the lamps 120 may be constant within the range of about 5 mm. For instance, when the distance between the lamps 120 and the reflection plate 105 is more than 5 mm, an optical sheet (not shown) to be coupled onto the lamps 120 may be influenced. This may cause a wrinkle phenomenon due to heat.

In order to control a distance between the reflection plate 105 and the lamps 120, the height of the balance PCBs 101 and 103 vertically disposed at both sides of the lower cover 100 may be controlled. Alternatively, the angle of the lamp sockets 101c and 103c may be controlled.

Here, will be explained a method for controlling a distance between the lamps 120 and the reflection plate 105 by controlling the angle of the lamp sockets 101c and 103c. The lamp sockets 101c and 103c may be bent freely enough for the lamps 120 to be coupled thereto. For instance, the lamp sockets 101c and 103c may be formed to have an 'L' shape. One end portions of the lamp sockets 101c and 103c are fixed on the balance PCBs 101 and 103, while another end portions thereof serve as holders for coupling the lamps 120.

The plurality of lamps 120 are coupled to the 'L'-shaped lamps sockets 101c and 103c fixed onto the balance PCBs 101 and 103, with a constant gap therebetween. Generally, an LCD TV of 32-inch is provided with about 16 lamps for high brightness, whereas an LCD TV of 40-inch is provided with about 18~20 lamps. However, the number of the lamps may be variable according to a model type of the LCD device. As the lamps 120, may be used one type of lamps among cold cathode fluorescent lamps (CCFL), external electrode fluorescent lamps (EEFL), and hot cathode fluorescent lamps (HCFL).

On the balance PCBs 101 and 103 including the lamps sockets 101c and 103c, disposed are fixing members for protecting the balance PCBs 101 and 103 from outside, i.e., side supports 130. Frames of the side support 130 formed by a pressing method include an inclined frame 130b formed to have a certain inclination angle and having semi-circular lamp fixing portions 130b1 for fixing the lamps 120 to the lower cover 100, a vertical frame 130a vertically formed and spacing from the inclined frame 130b, and an upper frame 130c extending from an upper side of the inclined frame 130b and the vertical frame 130a to be horizontally formed.

In the present invention, the vertical frames 130b of the side supports 130 are disposed at an outer periphery of both side walls of the lower cover 100. In order to outwardly protrude the connector 101a to which an AC high voltage is applied from the first and second inverters, holes are preferably formed at a part of the vertical frame 130a.

An optical member 140 is disposed in a state that both sides thereof are supported by the side supports 130. The optical member 140 includes a diffusion plate (not shown) for uniformly distributing light directly emitted from the plurality of lamps 120, and light reflected by the reflection plate 105 to all surfaces of the LC panel 150, and an optical sheet (not shown) such as a prism sheet and a protection sheet to allow light having passed through the diffusion plate to have an additional optical characteristic.

A main support 145 formed of molded synthetic resin or SUS steel is coupled to an upper side of the backlight unit. Here, the main support 145 is formed to have a stepped portion between inner and outer surfaces thereof with consideration that the LC panel 150 is disposed on a front surface (or upper surface) thereof. The main support 145 serves to maintain a balance of an entire force applied to the LCD device in the occurrence of an external impact, by being provided with the backlight unit therebelow.

The LC panel 150 disposed on the main support 145 undergoes a plurality of unit processes. More concretely, the LC panel 150 includes a TFT array substrate having a TFT at each unit pixel as a switching device, a color filter substrate having color filters for representing colors, and an LC injected between the TFT array substrate and the color filter substrate.

Polarizers 151 and 152 are attached to both side surfaces of the LC panel 150. The polarizers 151 and 152 serve to transmit only light vibrating in the same direction as polarizing axes, among light emitted from the backlight unit, but to absorb or reflect light vibrating in other directions by using a suitable medium, to implement light vibrating in a specific direction.

On the LC panel 150, disposed is the function member 160 for protecting the LC panel 150 from an external impact and reducing reflectivity of light incident from outside.

The functional member 160 includes a tempered substrate 160a for protecting the LC panel 150 from an external impact; an anti-reflect layer 160b disposed on the tempered substrate 160a to be exposed out, and contacting external light, and an adhesion layer 160c formed below the tempered substrate 160a and contacting the LC panel 150 or the polarizer 151 on the LC panel 150.

Here, the tempered substrate 160a may be implemented as tempered glass having a thickness of about 3 mm such that the LC panel 150 disposed therein is protected from an external impact. The tempered glass is formed by heating molded plate glass at a temperature of 500~600° C. close to a softening temperature, and is drastically cooled by compressed cool air. Then, the surface of the molded plate glass is deformed in compression, and the inside of the molded plate glass is deformed in tension. The tempered substrate has a bending intensity corresponding to 3~5 times of a general glass, an impact endurance corresponding to 3~8 times of a general glass, and an excellent heat endurance. Since the tempered substrate maintains a balance of an entire force therein, even if one side of the tempered substrate is cut off, the entire part is cracked into pieces. Accordingly, it is required to form the tempered substrate in a shape suitable for the purpose before performing a tempered process.

The anti-reflect layer 160b formed on an upper side surface of the tempered substrate 160a and exposed to external light has a surface processed by an anti-reflect sputtering. That is, the anti-reflect layer 160b is formed as two materials having different refractivity are alternately formed on the tempered substrate 160a in 5 or 6 layers. For instance, a first layer firstly exposed to sunlight or an external lamp is formed of a material having a low refractivity, a second layer is formed of a material having a high refractivity, and a third layer is again formed of a material having a low refractivity. Under this configuration, light incident from outside gradually disappears while passing through each layer, thereby reducing a reflectivity. However, the anti-reflect layer 160a does not necessarily undergo a surface processing using an anti-reflect sputtering. Rather, various surface-processing methods such as an anti-reflect coating, or anti-contamination processing or an anti-fingerprint processing may be applied to the anti-reflect layer 160a.

The adhesive layer 160c formed on a lower side surface of the tempered substrate 160a and contacting the LC panel 150 is formed of a paste, etc. having a similar refractivity to the upper tempered substrate 160a, or the lower polarizer 151 in a UV or thermal hardening manner. Light incident to the anti-reflect layer 160b and passing through the tempered substrate 160a is made to be continuously absorbed into (or to pass through) the adhesive layer 160c and the polarizer 151 having a similar refractivity to the tempered substrate 160a. Accordingly, a total reflectivity to outside of the LC panel 150 is reduced to the maximum.

For example, if light passing through the anti-reflect layer 160b contacts air disposed at an air gap between the functional member 160 including the anti-reflect layer 160b and the LC panel 150, the light is outwardly reflected from a boundary between the functional member 160 and the air gap, due to different refractivity between the tempered substrate 160a and the air. As a result, a total reflectivity to outside of the LC panel 150 increases.

To cope with this problem, the adhesive layer 160c on the functional member 160 is formed of a material having a similar refractivity to the tempered substrate 160a, and is formed of a material having a similar refractivity to the lower LC panel 150 or the polarizer 151 on the LC panel 150.

As the paste having a similar refractivity of 1.4~1.6 to the tempered substrate 160a or the polarizer 151, an optical elastic resin, SVR (super view resin) containing an acryl-based ultraviolet hardening type resin as a main component and made from Sony Corporation of Japan may be used.

Here, the paste may additionally include at least one of a solvent, a plasticizer, and/or an interface activator. The paste enhances a bonding force between the tempered substrate 160a and the polarizer 151 on the LC panel 150. An amount of the paste may be varied to accelerate a UV or thermal hardening process.

The paste is disposed on a lower side surface of the tempered substrate 160a in the form of liquid, and the tempered substrate 160a having the paste thereunder is attached onto the polarizer 151 formed on one side surface of the LC panel 150. Then, the paste is hardened by undergoing UV irradiation from an upper side of the tempered substrate 160a, or heat supply from a lower side of the LC panel 150. As a result, the protection member 160 coupled to the LC panel 150 is formed.

Rather than the method that a paste formed on a lower side surface of the tempered substrate 160a is adhered onto the LC panel 150, other methods may be used. That is, a paste may be formed on the polarizer 151 on the LC panel 150, or may be directly formed on the LC panel 150 when the polarizer 151 is not implemented. Then, the tempered substrate 160a is attached onto the paste. Then, the paste may undergo UV irradiation from an upper side of the tempered substrate 160a, or heat supply from a lower side of the LC panel 150, thereby being hardened. Accordingly, the functional member 160 coupled to the LC panel 150 may be formed.

When the functional member 160 is attached onto the LC panel 150, a moving width of the LC panel 150 is increased by a heavy weight of the functional member 160 in the occurrence of an external vibration or impact applied to the LCD device. This may cause the LC panel 150 to have damages at edge regions thereof when the LCD device collides with the main support 145.

In the present invention, the functional member 160 is formed to have a length (L') larger than a length (L) of the LC panel 150 with spacing from one or more sides of the LC panel 150. Here, the functional member 160 is formed within a range of a stepped inner portion (A) of an upper frame of the main support 145. Preferably, a tolerance between the functional member 160 and the main support 145 is less than a tolerance between the LC panel 150 and the main support 145.

For instance, at edge portions of the TFT-array substrate of the LC panel 150, a gate pad portion or/and a data pad portion may be exposed out such that gate and data signals are input thereto. Here, the TFT-array substrate where the gate or data pad portion is exposed out may be more susceptible to an external impact or vibration than in any other portions. Accordingly, the functional member 160 having higher impact resistance than the TFT-array substrate formed of glass, etc. is formed to have a length longer than that of the TFT-array substrate where the gate or data pad portion is exposed out. This causes the functional member 160 having high impact resistance to firstly come in contact with the main support 145 even when the LC panel 150 is moved by an external impact or vibration. As a result, the TFT-array substrate is prevented from being damaged.

An upper cover 170 is coupled to the main support 145 and/or the lower cover 100, with covering four edges of the functional member 160 disposed on the LC panel 150, and with covering side surfaces of the main support 145.

Figure 4:
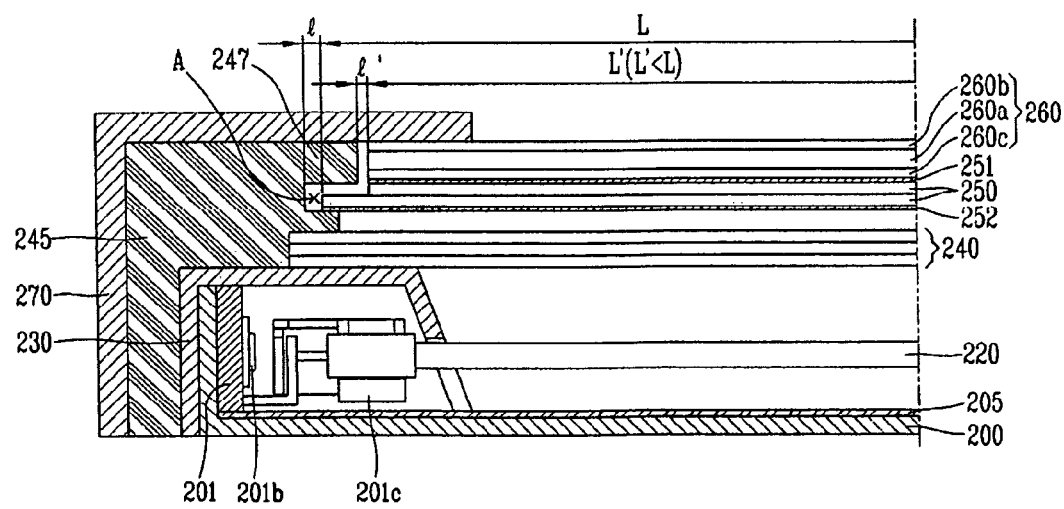
FIG. 4 is a sectional view of an LCD device according to a second embodiment of the present invention.

FIG. 4 is a sectional view of an LCD device according to a second embodiment of the present invention.

Referring to FIG. 4, the LCD device according to a second embodiment of the present invention comprises an LC panel 250, a backlight unit disposed below the LC panel 250 for providing light, a functional member 260 disposed on the LC panel 250 within a size range of the LC panel 250, and an impact damping member 247 disposed to be spacing from one or more sides of the functional member 260 for absorbing an impact of the functional member 260 when the LC panel 250 moves. Here, the impact damping member 247 is provided on the main support 245.

In the LCD device according to the second embodiment of the present invention, the length (L') of one or more sides of the functional member 260 disposed on the LC panel 250 is formed to be shorter than the length (L) of the LC panel 250. Here, the impact damping member 247 is disposed at the stepped inner portion (A) of an upper frame of the main support 245, more concretely, between the main support 245 and the functional member 260.

Under this configuration, when the LC panel 250 is moved, may be indirectly prevented damage of the LC panel 250 due to an impact between the main support 245 and the LC panel 250. More concretely, even when the LC panel 250 is moved in the occurrence of an external impact or vibration, damage of the LC panel 250 occurring as the LC panel 250 comes in contact with the main support 245 is prevented. The reason is because the functional member 260 and the impact damping member 247 firstly come in contact with each other.

To this end, a gap (l') between the functional member 260 having the length (L') and the main support 245 is formed to be narrower than a gap (t) between the LC panel 250 having the length (L) and the main support 245.

The impact damping member 247 is provided at the inner side portion (A) of the main support 245 through a strong adhesive or various coupling manners. The impact damping member 247 may be formed of the same material as the main support 245, i.e., synthetic resin or SUS steel, or may be formed of a different material.

When it is assumed that the impact damping member 247 is formed of the same material as the main support 245, the impact damping member 247 may be integrally formed with the main support 245. That is, when the main support 245 is injection molded, the impact damping member 247 may be simultaneously injection molded. Accordingly, the shape of the impact damping member 247 is not limited in the present invention.

The LCD device according to the second embodiment is similar to the LCD device according to the first embodiment except for the impact damping member 247, and their detailed explanations will be omitted.

Figure 5:
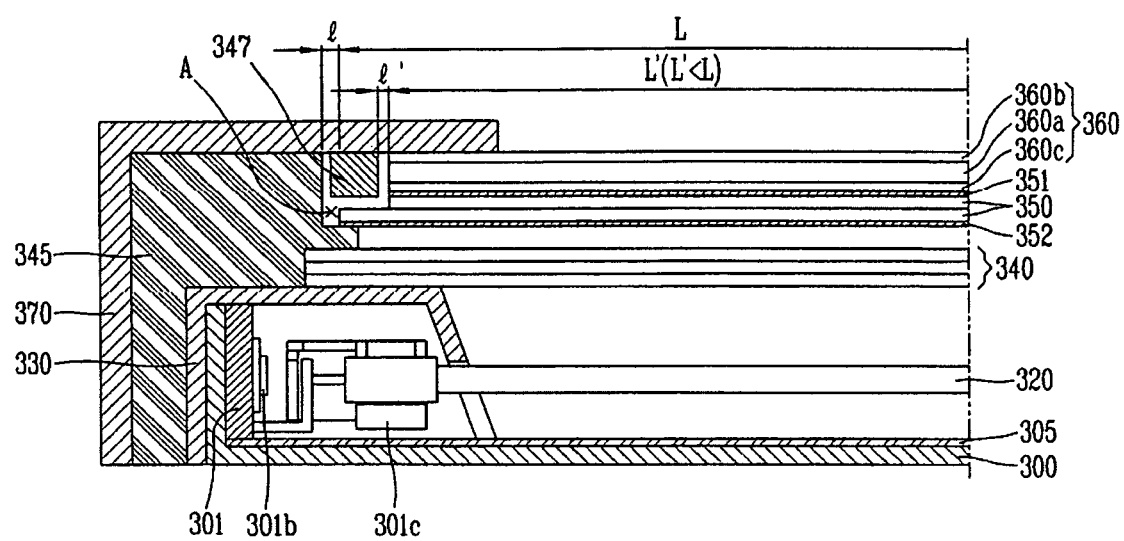
FIG. 5 is a sectional view showing a modification example of the LCD device of FIG. 4.

FIG. 5 is a sectional view showing a modification example of the LCD device of FIG. 4.

Referring to FIG. 5, the LCD device according to a third embodiment of the present invention comprises an LC panel 350, a backlight unit disposed below the LC panel 350 for providing light, a functional member 360 disposed on the LC panel 350 within a size range of the LC panel 350, an upper cover 370 coupled to an upper edge region of the functional member 360, and an impact damping member 347 disposed to be spacing from one or more sides of the functional member 360 for absorbing an impact of the functional member 360 when the LC panel 350 moves. Here, the impact damping member 347 is attached or coupled onto the upper cover 370.

In the same manner as the second embodiment, in the LCD device according to the third embodiment of the present invention, the length (L') of one or more sides of the functional member 360 disposed on the LC panel 350 is formed to be shorter than the length (L) of the LC panel 350. Here, the impact damping member 347 is disposed at the stepped inner portion (A) of an upper frame of the main support 345, more concretely, at the inner side portion (A) between the main support 245 and the functional member 260.

The impact damping member 247 may be formed of the same material as the main support 345, i.e., synthetic resin or SUS steel, or may be formed of a different material. The impact damping member 347 is attached or coupled onto the upper cover 370 through a strong adhesive or various coupling manners, and then is provided at the inner side portion (A) of the main support 345. Here, a gap (l') between the functional member 360 having the length (L') and the main support 345 is formed to be narrower than a gap (t) between the LC panel 350 having the length (L) and the main support 345.

Under this configuration, even if the LC panel 350 is moved by an external impact or vibration, damage of the LC panel 350 due to contact with the main support 345 is prevented. The reason is because the impact damping member 347 and the functional member 360 firstly come in contact with each other.

The LCD device according to the third embodiment is similar to the LCD device according to the first embodiment except for the impact damping member 347, and their detailed explanations will be omitted.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
an LC panel having a upper substrate and a lower substrate;
a main support for supporting the LC panel;
a backlight unit disposed below the LC panel for providing light; and
a functional member disposed on the LC panel,
wherein the LC panel and the functional member are received within the main support, the LC panel and the functional member being apart from inner sides of the main support, a distance between the LC panel and the inner sides of the main support being larger than a distance between the functional member and the inner sides of the main support so that the functional member is contacted with the inner sides of the main support and the upper and lower substrates of the LC panel are not contacted with the inner sides of the main support when an impact is applied to the LC panel.

2. The LCD device of claim 1, wherein the functional member is implemented as one of a tempered substrate and a touch panel.

3. The LCD device of claim 1, wherein a tolerance between the functional member and the main support is less than a tolerance between the LC panel and the main support.

4. The LCD device of claim 1, further comprising an extension portion extended from the inner side of the main support facing the function member so that the functional member is contacted with the main support when an impact is applied to the LC panel.

5. The LCD device of claim 1, further comprising an upper cover provided at upper edge regions of the LC panel and the functional member.

6. The LCD device of claim 1, wherein the functional member has one or more sides larger than the LC panel.

7. A liquid crystal display (LCD) device, comprising:
   an LC panel;
   a backlight unit disposed below the LC panel for providing light;
   a functional member attached to an upper surface of the LC panel within a size range of the LC panel;
   a main support for receiving the LC panel and the backlight unit to support thereof, inner sides of the main support being apart from the sides of the LC panel and the side of the functional member in the predetermined distance; and
   an impact damping member disposed between the inner sides of the main support and the side of the functional member so that a distance between the impact damping member and the functional member is smaller than a distance between the inner sides of the main support and the LC panel,
   wherein the side surface of the impact damping member is a distance from the main support so that the side surface of the functional member is contacted with the impact damping member and the side surface of the LC panel is not contacted with the impact damping member and the main support when an impact is applied to the LC panel.

8. The LCD device of claim 7, further comprising an upper cover provided at upper edge regions of the LC panel and the functional member.

9. The LCD device of claim 8, wherein the impact damping member is coupled onto the upper cover.

* * * * *